United States Patent
Rane (10) Patent No.: US 10,972,319 B2
(45) Date of Patent: Apr. 6, 2021

(54) CLOCKLESS DECISION FEEDBACK EQUALIZATION (DFE) FOR MULTI-LEVEL SIGNALS

(71) Applicant: TEXAS INSTRUMENTS INCORPORATED, Dallas, TX (US)

(72) Inventor: Amit Rane, Santa Clara, CA (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 0 days.

(21) Appl. No.: 16/128,605

(22) Filed: Sep. 12, 2018

(65) Prior Publication Data

US 2020/0084069 A1    Mar. 12, 2020

(51) Int. Cl.
*H04L 25/03*    (2006.01)

(52) U.S. Cl.
CPC .............. *H04L 25/03057* (2013.01)

(58) Field of Classification Search
None
See application file for complete search history.

(56) References Cited

U.S. PATENT DOCUMENTS

| | | | | |
|---|---|---|---|---|
| 4,847,797 A * | 7/1989 | Picchi | ............ | H04L 25/0307 708/3 |
| 5,297,166 A * | 3/1994 | Batruni | ............ | H04L 25/0307 375/233 |
| 5,491,518 A * | 2/1996 | Kim | ............ | H04N 5/211 348/607 |
| 5,502,507 A * | 3/1996 | Kim | ............ | H04N 5/211 348/607 |
| 5,682,160 A * | 10/1997 | Ribner | ............ | H03M 3/374 341/143 |
| 5,682,161 A * | 10/1997 | Ribner | ............ | H03M 3/412 341/143 |
| 5,822,143 A * | 10/1998 | Cloke | ............ | G11B 5/09 360/65 |
| 5,956,195 A * | 9/1999 | Brickner | ............ | G11B 5/59688 341/59 |
| 5,966,262 A * | 10/1999 | Brickner | ............ | G11B 20/10009 360/65 |

(Continued)

FOREIGN PATENT DOCUMENTS

| | | | | |
|---|---|---|---|---|
| CN | 109560817 A | * | 4/2019 | ......... H04L 25/0300 |
| WO | 2018063732 A1 | | 4/2018 | |
| WO | WO-2018063732 A1 | * | 4/2018 | ....... H04L 25/03019 |

OTHER PUBLICATIONS

Patent Cooperation Treaty Search Report, PCT/US 2019/050208, dated Sep. 9, 2019, 2 pages.

*Primary Examiner* — Berhanu Tadese
(74) *Attorney, Agent, or Firm* — Ray A. King; Charles A. Brill; Frank D. Cimino (57) ABSTRACT

An apparatus includes a clockless decision feedback equalization (DFE) loop. The clockless DFE loop includes a summation circuit configured to combine a multi-level input signal and a multi-level feedback signal. The clockless DFE loop also includes a multi-bit quantizer configured to provide the multi-level feedback signal based on an output of the summation circuit. The clockless DFE loop also includes one or more analog delay circuits configured to delay the multi-level feedback signal to the summation circuit. The clockless DFE loop also includes a DFE tap circuit configured to apply signed DFE tap weights to the multi-level feedback signal.

11 Claims, 10 Drawing Sheets

(56) References Cited

U.S. PATENT DOCUMENTS

| | | | | |
|---|---|---|---|---|
| 6,047,026 A * | 4/2000 | Chao | H04L 25/03057 | 375/233 |
| 6,396,428 B1 * | 5/2002 | Cheng | H03M 3/37 | 341/143 |
| 6,404,368 B1 * | 6/2002 | Yamaguchi | H03M 3/412 | 341/143 |
| 6,553,518 B1 * | 4/2003 | Ware | H04L 25/03057 | 375/233 |
| 6,621,862 B1 * | 9/2003 | Dabell | H04L 25/03038 | 375/229 |
| 6,724,839 B1 * | 4/2004 | Chan | H04L 25/03159 | 375/232 |
| 7,057,540 B2 * | 6/2006 | Muhammad | H03M 3/47 | 341/143 |
| 7,292,962 B1 * | 11/2007 | Gross | G06F 11/3082 | 702/179 |
| 7,385,539 B2 * | 6/2008 | Vanselow | H03L 7/08 | 331/1 A |
| 7,432,841 B1 * | 10/2008 | Kinyua | H03M 3/414 | 341/143 |
| 7,948,414 B2 * | 5/2011 | Lin | H03M 3/424 | 341/143 |
| 8,212,702 B2 * | 7/2012 | Lin | H03M 3/424 | 341/143 |
| 8,737,490 B1 * | 5/2014 | Wilson | H04L 25/03057 | 375/246 |
| 8,737,491 B1 * | 5/2014 | Wilson | H04L 25/03343 | 375/246 |
| 8,977,666 B2 * | 3/2015 | Huang | H04L 25/03019 | 708/322 |
| 9,231,793 B1 * | 1/2016 | Vareljian | H04L 25/03057 | |
| 9,455,848 B1 * | 9/2016 | Zhang | H04L 7/0087 | |
| 9,462,375 B2 * | 10/2016 | Petkov | H04R 3/00 | |
| 9,626,981 B2 * | 4/2017 | Chesney | H03M 3/458 | |
| 9,800,435 B1 * | 10/2017 | Ho | H04L 25/03057 | |
| 10,171,270 B1 * | 1/2019 | Verkila | H04L 25/03057 | |
| 10,453,465 B2 * | 10/2019 | Chesney | G10L 19/032 | |
| 10,498,353 B2 * | 12/2019 | Huang | H03M 3/428 | |
| 2002/0154248 A1 * | 10/2002 | Wittig | H04L 1/0054 | 348/614 |
| 2002/0154690 A1 * | 10/2002 | Okazaki | H04L 7/041 | 375/232 |
| 2002/0172305 A1 * | 11/2002 | Kim | H04L 25/497 | 375/340 |
| 2002/0181574 A1 * | 12/2002 | Aizawa | H04L 25/03178 | 375/232 |
| 2003/0189997 A1 * | 10/2003 | Shanbhag | H04L 25/03878 | 375/348 |
| 2003/0189998 A1 * | 10/2003 | Phanse | H04L 25/03057 | 375/348 |
| 2003/0198288 A1 * | 10/2003 | Abdelilah | H04L 1/0021 | 375/222 |
| 2003/0202612 A1 * | 10/2003 | Halder | H03H 17/0288 | 375/265 |
| 2003/0227968 A1 * | 12/2003 | Kim | H04L 25/0305 | 375/233 |
| 2004/0141567 A1 * | 7/2004 | Yang | H03L 7/0891 | 375/287 |
| 2004/0179483 A1 * | 9/2004 | Perlow | H04L 25/0218 | 370/278 |
| 2004/0228399 A1 * | 11/2004 | Fimoff | H04L 25/03057 | 375/233 |
| 2005/0002306 A1 * | 1/2005 | Urita | G11B 20/10425 | 369/59.21 |
| 2005/0025230 A1 * | 2/2005 | Hillery | H04L 25/03057 | 375/233 |
| 2006/0023799 A1 * | 2/2006 | Kang | H04N 5/211 | 375/260 |
| 2006/0188027 A1 * | 8/2006 | Jeckeln | H04B 14/062 | 375/247 |
| 2006/0233230 A1 * | 10/2006 | Sato | H04L 25/0224 | 375/232 |
| 2007/0205931 A1 * | 9/2007 | Vanselow | H03L 7/08 | 341/143 |
| 2008/0137723 A1 * | 6/2008 | Liu | H04L 25/03006 | 375/235 |
| 2008/0240325 A1 * | 10/2008 | Agazzi | H04L 25/03038 | 375/371 |
| 2009/0185613 A1 * | 7/2009 | Agazzi | H04L 1/0054 | 375/232 |
| 2009/0220035 A1 * | 9/2009 | Park | H04L 25/03159 | 375/343 |
| 2009/0225823 A1 * | 9/2009 | Chen | H04L 25/03044 | 375/230 |
| 2010/0074320 A1 * | 3/2010 | Park | H04B 3/04 | 375/233 |
| 2010/0098147 A1 * | 4/2010 | Miller | H04L 25/03057 | 375/233 |
| 2010/0158096 A1 * | 6/2010 | Yang | H04L 25/03057 | 375/233 |
| 2010/0226423 A1 * | 9/2010 | Chen | H04L 25/03019 | 375/232 |
| 2011/0004803 A1 * | 1/2011 | Yokomakura | H04L 25/03171 | 714/752 |
| 2011/0032132 A1 * | 2/2011 | Lin | H03M 3/424 | 341/143 |
| 2011/0187571 A1 * | 8/2011 | Lin | H03M 3/424 | 341/143 |
| 2011/0191656 A1 * | 8/2011 | Bliss | H03M 13/151 | 714/776 |
| 2011/0268169 A1 * | 11/2011 | Mitsugi | H04L 25/03159 | 375/226 |
| 2012/0134407 A1 * | 5/2012 | Bhoja | H03H 21/0012 | 375/233 |
| 2012/0300831 A1 * | 11/2012 | Luo | H04N 21/43635 | 375/233 |
| 2013/0241622 A1 * | 9/2013 | Zerbe | H03K 3/013 | 327/323 |
| 2014/0301572 A1 * | 10/2014 | Melanson | H03M 3/00 | 381/111 |
| 2015/0084797 A1 * | 3/2015 | Singh | H03M 3/37 | 341/143 |
| 2015/0109157 A1 * | 4/2015 | Caldwell | G01R 19/25 | 341/143 |
| 2015/0358724 A1 * | 12/2015 | Petkov | H04R 3/00 | 381/95 |
| 2015/0380005 A1 * | 12/2015 | Chesney | G10L 19/04 | 704/500 |
| 2017/0093601 A1 * | 3/2017 | Ho | H04L 25/03146 | |
| 2017/0194012 A1 * | 7/2017 | Chesney | G10L 19/04 | |
| 2018/0115328 A1 * | 4/2018 | Kuan | H04B 14/064 | |
| 2018/0248577 A1 * | 8/2018 | Hossain | H04L 27/01 | |
| 2019/0181880 A1 * | 6/2019 | Huang | H03M 1/68 | |
| 2019/0199368 A1 * | 6/2019 | Weng | H03M 3/454 | |
| 2020/0084069 A1 * | 3/2020 | Rane | H04L 25/03057 | |

\* cited by examiner

CLOCKLESS DECISION FEEDBACK EQUALIZATION (DFE) FOR MULTI-LEVEL SIGNALS

BACKGROUND

The proliferation of networked electronic devices continues along with related efforts to increase signaling speed while maintaining signal integrity. The core of a communication link consists of a transmitter that generates the signal, a channel that carries the signal and a receiver that accepts the signal and processes it correctly. Signals can be carried by channels as electrical signals, optical pulses, or electromagnetic signals. For accurate signaling between networked devices or components, the integrity of the signal needs to be maintained. From a physical layer standpoint, this means that if a "1" is sent from the transmitter and down the channel, be it copper, optical fiber or air, the receiver should also determine that the signal is a "1". This is a fundamental challenge for data transmission system and circuit designers due to the various factors affecting signal integrity.

Signal integrity in data transmission systems is affected by a number of factors. Apart from random noise, atmospheric and man-made noise, there are deterministic factors that contribute to deteriorating signal integrity. Copper-based signal transmission is affected by the limited bandwidth of copper channels and crosstalk from adjacent channels. Optical signals are affected by frequency-independent loss of optical power as they travel down the fiber as well as dispersion-causing mechanisms depending on the type of fiber. Bandwidth limitations in copper and pulse dispersion in optical fibers result in inter-symbol-interference (ISI) at the receiver. Typically, ISI deteriorates as the data rate and the length of the channel increases. ISI is the primary factor limiting transmission distances over copper-based transmission channels and optical fiber at high data-rates (e.g., 10-Gb/sec). Efforts to compensate for ISI and otherwise maintain signal integrity has resulted in various transmitter-side and receiver-side technologies, including equalization.

Equalization is a process of conditioning the electrical signal, either at the transmitter or the receiver to compensate for channel-induced ISI and improve signal integrity. Linear and non-linear equalization techniques have been explored in the literature. One non-linear equalization technique is referred to as decision-feedback equalization (DFE). In DFE, a delay element is introduced into the receiver circuitry and equalization values are combined with an input data stream. Efforts to improve DFE design, including reducing complexity and circuit footprint, are ongoing.

SUMMARY

In accordance with at least some examples of the disclosure, an apparatus comprises a clockless decision feedback equalization (DFE) loop. The clockless DFE loop comprises a summation circuit configured to combine a multi-level input signal and a multi-level feedback signal. The clockless DFE loop also comprises a multi-bit quantizer configured to provide the multi-level feedback signal based on an output of the summation circuit. The clockless DFE loop also comprises an analog delay circuit configured to delay the multi-level feedback signal to the summation circuit. The clockless DFE loop also comprises a DFE tap circuit configured to apply signed DFE tap weights to the multi-level feedback signal.

In accordance with at least some examples of the disclosure, a DFE loop comprises a summation circuit configured to combine a multi-level input signal and a multi-level feedback signal. The DFE loop also comprises a plurality of quantizer paths coupled to the summation circuit and configured to provide the multi-level feedback signal, wherein each quantizer path includes a respective slicer set to a different threshold, and wherein the multi-level feedback signal is generated by combining outputs of the plurality of quantizer paths. The DFE loop also comprises a set of analog delay components for each of the plurality of quantizer paths to delay the multi-level feedback signal to the summation circuit. The DFE loop also comprises a DFE tap circuit configured to apply signed DFE tap weights to the multi-level feedback signal.

In accordance with at least some examples of the disclosure, a clockless DFE loop method comprises obtaining DFE loop results at each of a plurality of time values. Obtaining DFE loop results comprises determining a combination signal based on a received multi-level input signal and a DFE feedback signal. Obtaining DFE loop results also comprises quantizing the combination signal using a plurality of quantizer paths with analog delay and signed DFE tap weighting to determine a next DFE feedback signal. The clockless DFE method also comprises outputting each combination signal as a DFE loop result for each of the plurality of time values.

BRIEF DESCRIPTION OF THE DRAWINGS

For a detailed description of various examples, reference will now be made to the accompanying drawings in which.

DETAILED DESCRIPTION

Disclosed herein are clockless decision feedback equalization (DFE) loop topologies for multi-level signaling such as PAM4 (4-level pulse amplitude modulation). With the disclosed clockless DFE loop topologies, a multi-level input signal is fed into a summation circuit that combines the multi-level input signal with a multi-level feedback signal. In some examples, the multi-level feedback signal is generated by feeding the output of the summation circuit into a multi-bit quantizer with a plurality of quantizer paths. Along each quantizer path, various operations are performed including signal slicing relative to a threshold and applying a signed DFE tap weight. Also, each quantizer path includes an analog delay circuit to delay the timing of when the multi-level feedback signal (obtained by combining the outputs of the quantizer paths) is provided to the summation circuit. In some examples, a clockless DFE loop includes adjustable features such as adjustable slicer thresholds (e.g., based on a peak-to-peak analysis) and/or adjustable scaling of DFE tap weights (e.g., based on eye analysis results). With the clockless DFE loop topologies described herein clocked components and clock recovery components are avoided. Thus, the size of the disclosed clockless DFE loop topologies for multi-level signaling is reduced compared to clocked DFE topologies. To provide a better understanding, various clockless DFE loop topology options, circuit options, and method options are described using the figures as follows.

Figure 1:
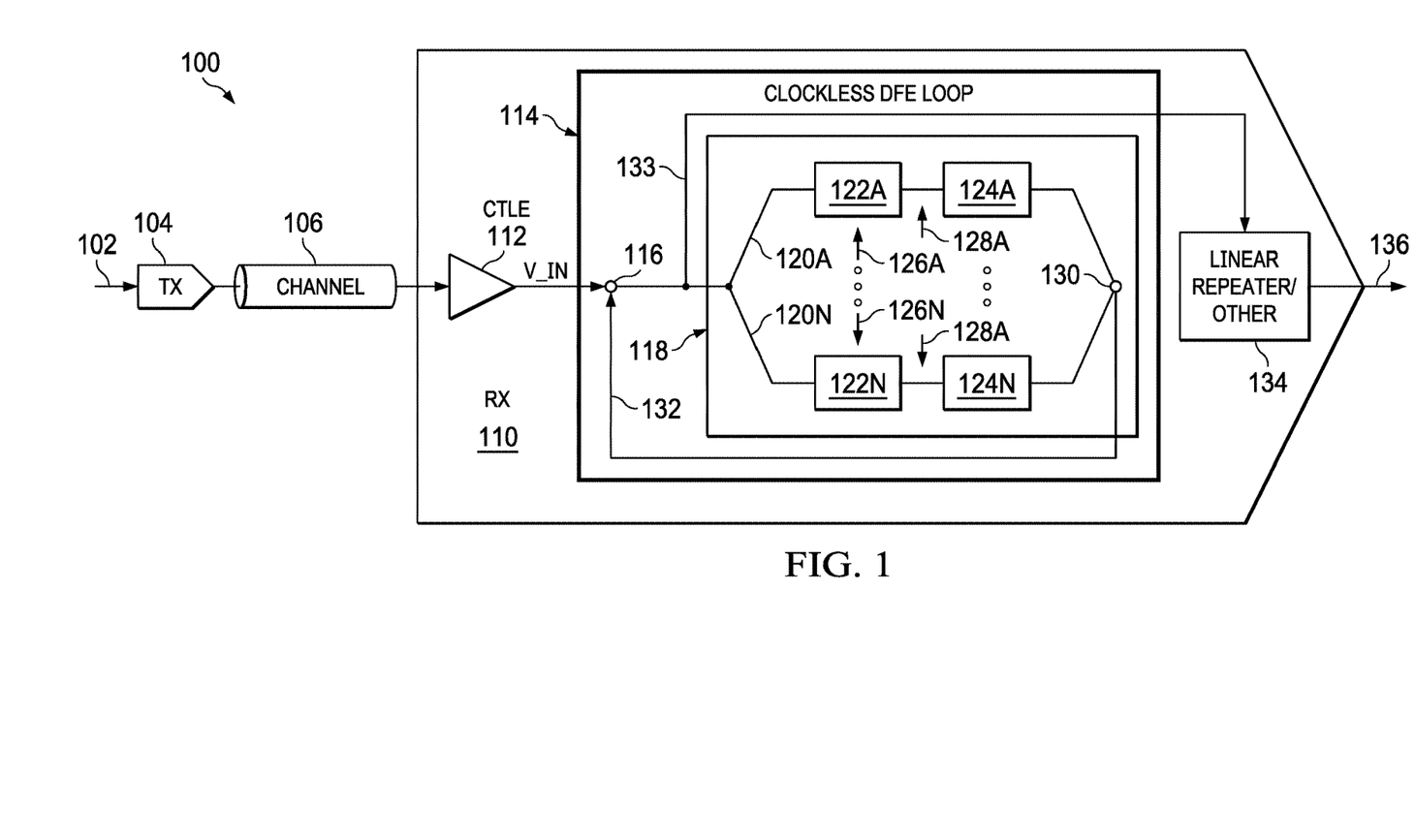
FIG. 1 shows a block diagram of a system with a clockless decision feedback equalization (DFE) loop in accordance with various examples.

FIG. 1 shows a block diagram of a system 100 with a clockless DFE loop 114 in accordance with various examples. As shown, the system 100 includes a transmitter 104, a channel 106, and a receiver 110, where the receiver 110 employs continuous time linear equalizer (CTLE) 112 and the clockless DFE loop 114 to perform equalization operations, which facilitate recovery of source data 102 transmitted by the transmitter 104 via the channel 106. The channel 106 represents one or more physical transmission mediums (e.g., wires, air, optical fiber, etc.) used to convey signals between the transmitter 104 and the receiver 110. In operation, the transmitter 104 receives the source data 102 and conveys a multi-level signal representing the source data 102 to the channel 106. The receiver 110 operates to receive multi-level signals from the channel 106 and to recover the source data 102. As desired, the receiver 110 stores recovered data locally and/or passes recovered data linearly to another communication link.

Figure 2:
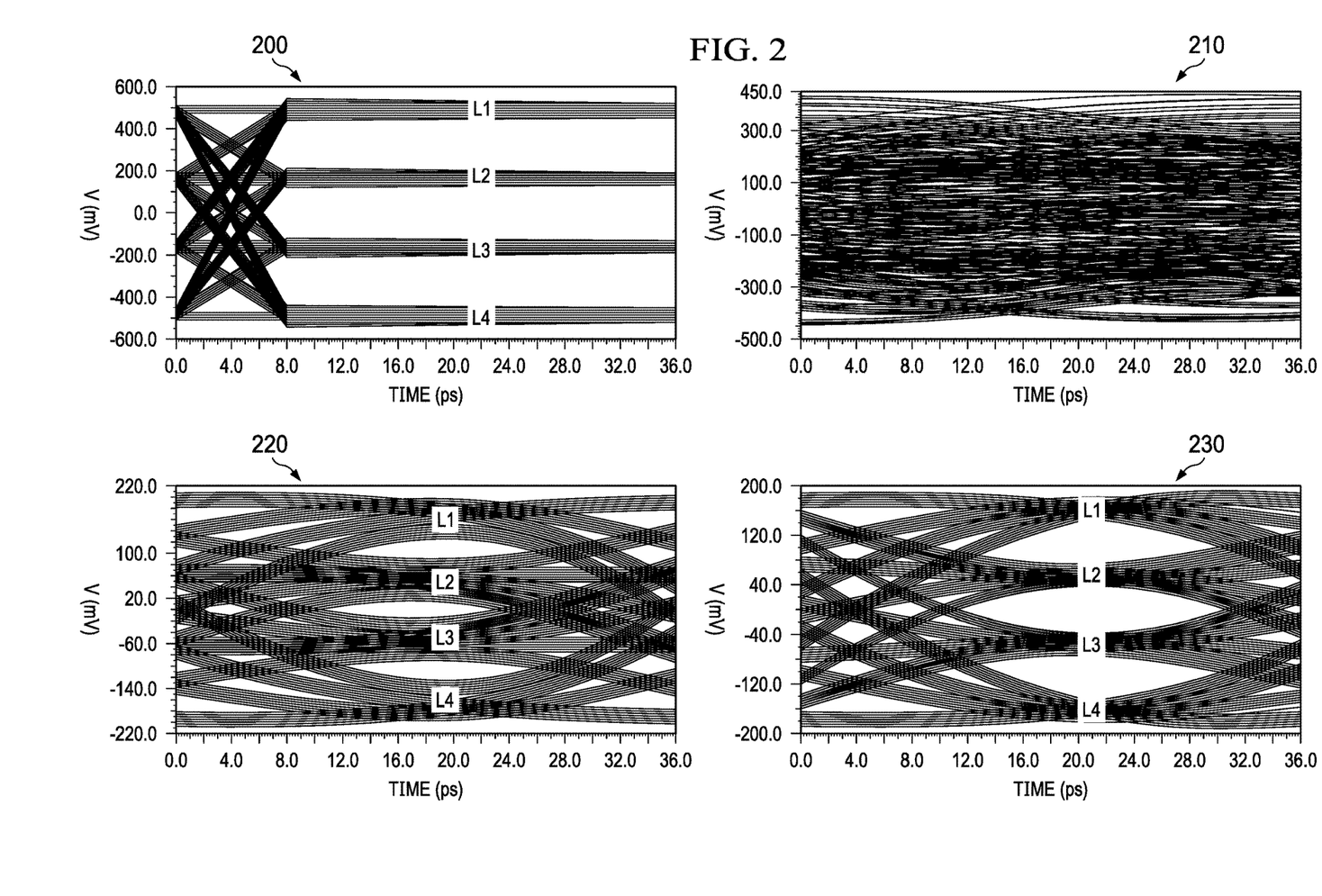
FIG. 2 shows graphs representing eye diagrams at different points of the system of FIG. 1 in accordance with various examples.

Recovering the source data 102 at the receiver 110 involves various operations, including those performed by the clockless DFE loop 114. FIG. 2 shows eye diagrams that represent how a transmitted signal is affected by the channel 106 and how the operations of the clockless DFE loop 114 affect a received signal. In FIG. 2, graph 200 show an eye diagram for four-level signaling at a transmitter such as the transmitter 104. As shown, the four-level signaling represented in graph 200 includes signals transmitted at four voltage levels (L1-L4). Graph 210 shows an eye diagram representing signals related to the four-level signaling represented in graph 200 after conveyance through a channel such as the channel 106. As shown in graph 210, the signals represented do not correspond only to the voltage levels L1-L4 due to channel effects (e.g., frequency dependent delay and attenuation). Graph 220 shows an eye diagram representing signals related to the four-level signaling represented in graph 200 after conveyance through a CTLE such as the CTLE 112. As shown in graph 220, the voltage levels L1-L4 corresponding to four-level signaling in graph 200 are clearer with CTLE (compared to signals in graph 210), but there is still significant distortion than can affect data recovery. Graph 230 shows an eye diagram representing signals related to the four-level signaling represented in graph 200 after conveyance through a clockless DFE loop such as the clockless DFE loop 114. As shown in graph 230, the voltage levels L1-L4 corresponding to the four-level signaling in graph 200 are sufficiently clear after operations of a clockless DFE loop to enable data recovery with a high degree of certainty. It should be understood that four-level signaling is only an example. In different examples, a clockless DFE loop is used in other multi-level signaling scenarios, such as six-level signaling (e.g., PAM6) or eight-level signaling (e.g., PAM8).

The operations of the clockless DFE loop 114 include briefly delaying and modifying receiver-side signals, resulting in "equalized" receiver-side signals such as the signals represented in graph 230. Compared to the signals in graphs 210 and 220, the signals in graph 230 more closely resemble the signals in graph 200 (at least during a particular intervals in time during which data recovery is possible). With the clockless DFE loop 114, higher-speed signaling due to a reduction in intersymbol interference (ISI) is possible.

In different examples, the operations performed by the clockless DFE loop 114 vary. In some examples, the clockless DFE loop 114 performs a 1-tap DFE operation (as in the examples given herein). In other examples, a clockless DFE loop is configured to perform 2-tap DFE operations, or other multi-tap DFE operations (e.g., 3 or more taps). Also, in different examples, DFE operations of the clockless DFE loop 114 vary with regard to the signed DFE tap weights (equalization values) applied to a signal. In general, the DFE operations of the clockless DFE loop 114 attempt to account for the effect of a channel (e.g., the channel 106) by combining a multi-level input signal with a multi-level feedback signal (a delayed and quantized version of the multi-level input signal).

In FIG. 1, the clockless DFE loop 114 operates on a multi-level input signal (V_IN), which is provided from the CTLE 112 to the clockless DFE loop 114. In different examples, V_IN is an amplified and/or cleaner signal relative to the signal provided by the channel 106 (e.g., the CTLE 112 performs amplification and/or signal cleaning operations). As shown, V_IN is received by a summation circuit 116. The summation circuit 116 also receives a multi-level feedback signal 132. The output of the summation circuit 116 is a combination signal 133 that is output from the clockless DFE loop 114 to another component 134 such as a linear repeater, a re-timer, or other component. The combination signal 133 is also provided to a multi-bit quantizer 118. The multi-bit quantizer 118 includes a plurality of quantizer paths 120A-120N, where each of the quantizer paths 120A-120N has a respective one of the slicers 122A-122N and a respective one of the analog delay circuits 124A-124N. As desired, different thresholds 126A-126N are applied to different ones of the slicers 122A-122N. In some examples, at least some of the thresholds 126A-126N are selected based on a peak-to-peak analysis for a multi-level input signal. Also, different signed DFE weights 128A-128N are applied along each of the quantizer paths 120A-120N. In some examples, at least some of the signed DFE weights 128A-128N are selected based on an eye analysis for a multi-level input signal. In some examples, the analog delay circuits 124A-124N are positioned before the slicers 122A-122N in each respective quantizer path 120A-120N.

In an example clockless DFE loop 114 for four-level signals (e.g., PAM4), the multi-bit quantizer 118 includes three quantizer paths (e.g., quantizer paths 120A-120C). In an example clockless DFE loop 114 for eight-level signals (e.g., PAM8), the multi-bit quantizer 118 includes seven quantizer paths (e.g., quantizer paths 120A-120G). In an example clockless DFE loop 114 for 16-level signals (e.g., PAM16), the multi-bit quantizer 118 includes fifteen quantizer paths, and so on.

Figure 3:
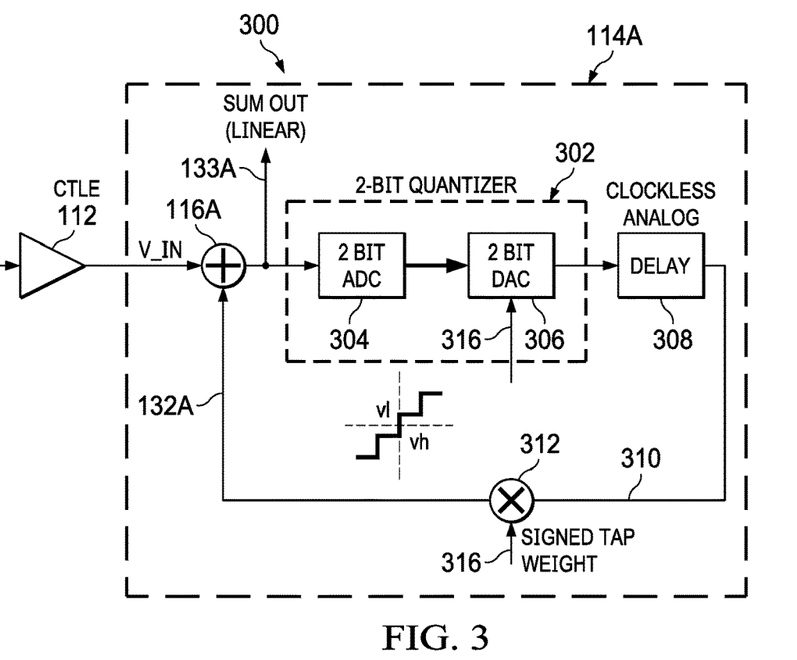
FIG. 3 shows a block diagram of equalization components, including a clockless DFE loop, in accordance with various examples.

FIG. 3 shows a block diagram 300 of equalization components, including a clockless DFE loop 114A (an example of the clockless DFE loop 114 in FIG. 1), in accordance with various examples. The block diagram 300 also includes the CTLE 112 introduced in FIG. 1. As shown in FIG. 3, the clockless DFE loop 114A includes a summation circuit 116A (an example of the summation circuit 116 in FIG. 1) and a 2-bit quantizer 302 (an example of the multi-bit quantizer 118 in FIG. 1). The 2-bit quantizer 302 of FIG. 3 is represented as having a 2-bit analog-to-digital converter (ADC) 304 and a 2-bit digital-to-analog converter (DAC) 306, which correspond to at least part of the plurality of quantizer paths 120A-120N in FIG. 1. More specifically, the slicing operations (corresponding to the slicers 122A-122N in FIG. 1) are performed the 2-bit DAC 306 in FIG. 3. In some examples, the 2-bit ADC 304 is a flash ADC and the 2-bit DAC 306 is a flash DAC.

Also shown in the clockless DFE loop 114A of FIG. 3 is a delay block 308, which corresponds to the analog delay circuits 124A-124N represented in FIG. 1. In different examples, the delay block 308 is positioned before or after slicing operations of the 2-bit quantizer 302. In one example, the delay block 308 provides a delay such that a multi-level feedback signal 314 is delayed by one unit interval (UI) relative to the multi-level input signal (V_IN) received from the CTLE 112.

In some examples, one or more control signals 316 to the 2-bit DAC 306 enables the clockless DFE loop 114A to account for non-linearity during the data recovery process. In one example, the one or control signals 316 enables at least some slicer thresholds to be adjusted (e.g., based on a peak-to-peak analysis results for V_IN). In FIG. 3, the output of the delay block 308 is provided to a signed tap weight node 312, which applies signed tap weights to the outputs of the delay block 308. In some examples, the signed tap weights and/or scaling factors applied to the signed tap weight are selected based on one or more control signals 316 (e.g., based on eye analysis results). The output of the signed tap weight node 312 is a multi-level feedback signal 132A (an example of the multi-level feedback signal 132 in FIG. 1), which is provided to the summation circuit 116A. The operations of the clockless DFE loop 114A are repeated with each new combination signal 133A (an example of the combination signal 133 in FIG. 1) from the summation circuit 116A being the output from the clockless DFE loop 114A. Each combination signal 133A is also the signal used to determine the next multi-level feedback signal.

Figure 4:
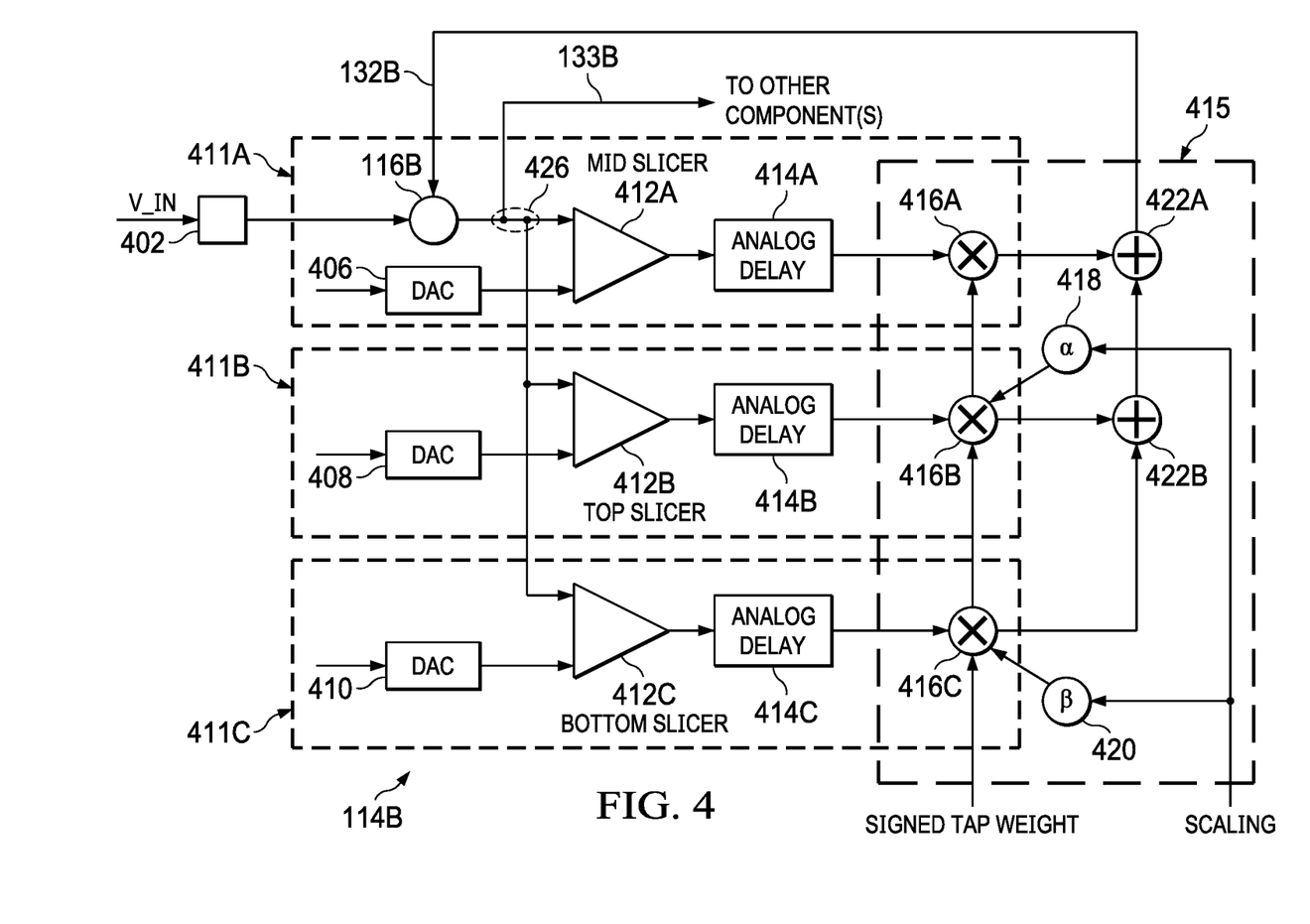
FIG. 4 shows a block diagram of a clockless DFE loop in accordance with various examples.

FIG. 4 shows a block diagram of a clockless DFE loop 1146 (an example of the clockless DFE loop 114 in FIG. 1, or the clockless DFE loop 114A in FIG. 2), in accordance with various examples. In the example of FIG. 4, the clockless DFE loop 114B generates combination signals 133B by combining four-level input signals (e.g., V_IN is a four-level signal in FIG. 4) with four-level feedback signals 132B. In at least some examples, the clockless DFE loop 114B includes a linear gain buffer 402 and a summation circuit 116B (an example of the summation circuit 116 in FIG. 1), which combines an amplified and buffered version of V_IN with a multi-level feedback signal 1326 (an example of the multi-level feedback signal 132 in FIG. 1). The combination signal 133B output from the summation circuit 116B is provided as an output of the clockless DFE loop 114B, and is used to determine a next multi-level feedback signal 132B.

To determine the next multi-level feedback signal 132B, the combination signal 133B is fed into different slicers 412A, 412B, and 412C. More specifically, the slicer 412A is referred to as a "mid" slicer, the slicer 412B is referred to as a "top" slicer, and the slicer 412C is referred to as a "bottom" slicer. This is because, in at least some examples, the clockless DFE loop 114B is used with differential signals. In such examples, the mid slicer 412A uses a threshold set to ground. Meanwhile, the top slicer 412B uses a threshold above ground (a positive threshold), and the bottom slicer 412C uses a threshold below ground (a negative threshold). In FIG. 4, the threshold for the mid slicer 412A is provided by DAC 406, the threshold for the top slicer 4126 is provided by DAC 408, and the threshold for the bottom slicer 412C is provided by DAC 410. In some examples, the threshold provided by the DAC 408 for the top slicer 4126 is based on a peak-to-peak analysis for the combination signal 133B. Similarly, in some examples, the threshold provided by the DAC 410 for the bottom slicer 412C is based on a peak-to-peak analysis for the combination signal 1336. As an example if the peak-to-peak value is 1 Volt, the threshold for the slicer 412B is set at T1*1 Volt and the threshold for the slicer 412C is set at T2*1 Volt. In one example, T1=0.33, and T2=−0.33. The output from each of the slicers 412A, 412B, and 412C is one of two values (e.g., +200 mV or −200 mV) depending on the result of comparing the input signal with a respective threshold. In different examples, the difference between the alternative values output from the slicers varies (e.g., +50 mV or −50 mV, +100 mV or −100 mV, +200 mV or −200 mV, +300 mV or −300 mV, +400 mV or −400 mV, and so on).

In FIG. 4, the slicers 412A, 412B, and 412C are represented as components along respective quantizer paths 411A-411C, where each of the quantizer paths 411A-411C includes a respective one of the slicers 412A, 412B, and 412C and a respective one of the analog delay circuits 414A, 414B, and 414C. The DACs 406, 408, and 410 are also part of each respective quantizer path 411A, 411B, and 411C.

As shown, each of the quantizer paths 411A-411C feeds into a signed tap weight circuit 415 configured to apply a signed tap weight to each quantizer path 411A-411C. The application of the signed tap weight is represented by multipliers 416A, 416B, and 416C along each quantizer path 411A-411C. In at least some examples, the signed tap weight circuit 415 includes scaling circuits 418 and 420 to adjust one or more of the signed tap weights to account for non-linearity. In one example, the scaling circuit 418 applies a scaling factor, α, to the signed tap weight for the top quantizer path 411B. Meanwhile, the scaling circuit 420 applies a scaling factor, β, to the signed tap weight for the bottom quantizer path 411C. In one example, α=1.5 and β=1.5. The scaling factors are applied, for example, based on eye analysis results. The outputs of the quantizer paths 411A, 411B, and 411C are combined by a summation circuit of the signed tap weight circuit 415 (represented by addition nodes 422A and 422B) to generate the next multi-level feedback signal 132B, where each multi-level feedback signal 132B is a delayed and quantized version of the multi-level input signal, V_IN.

The operations of the clockless DFE loop 114B continue with combination signals 133B provided as the output of the clockless DFE loop 114B. As needed, the analog delay blocks 414A, 414B, 414C are varied to support different signaling speed. In one example, the clockless DFE loop 114B is designed for use with 56 Gigabit/second PAM4 signaling. For slower signaling, the analog delay blocks 414A, 414B, 414C are adjusted, for example, by adding a capacitor coupled to ground along each of the quantizer paths 411A, 411B, and 411C.

Figure 5:
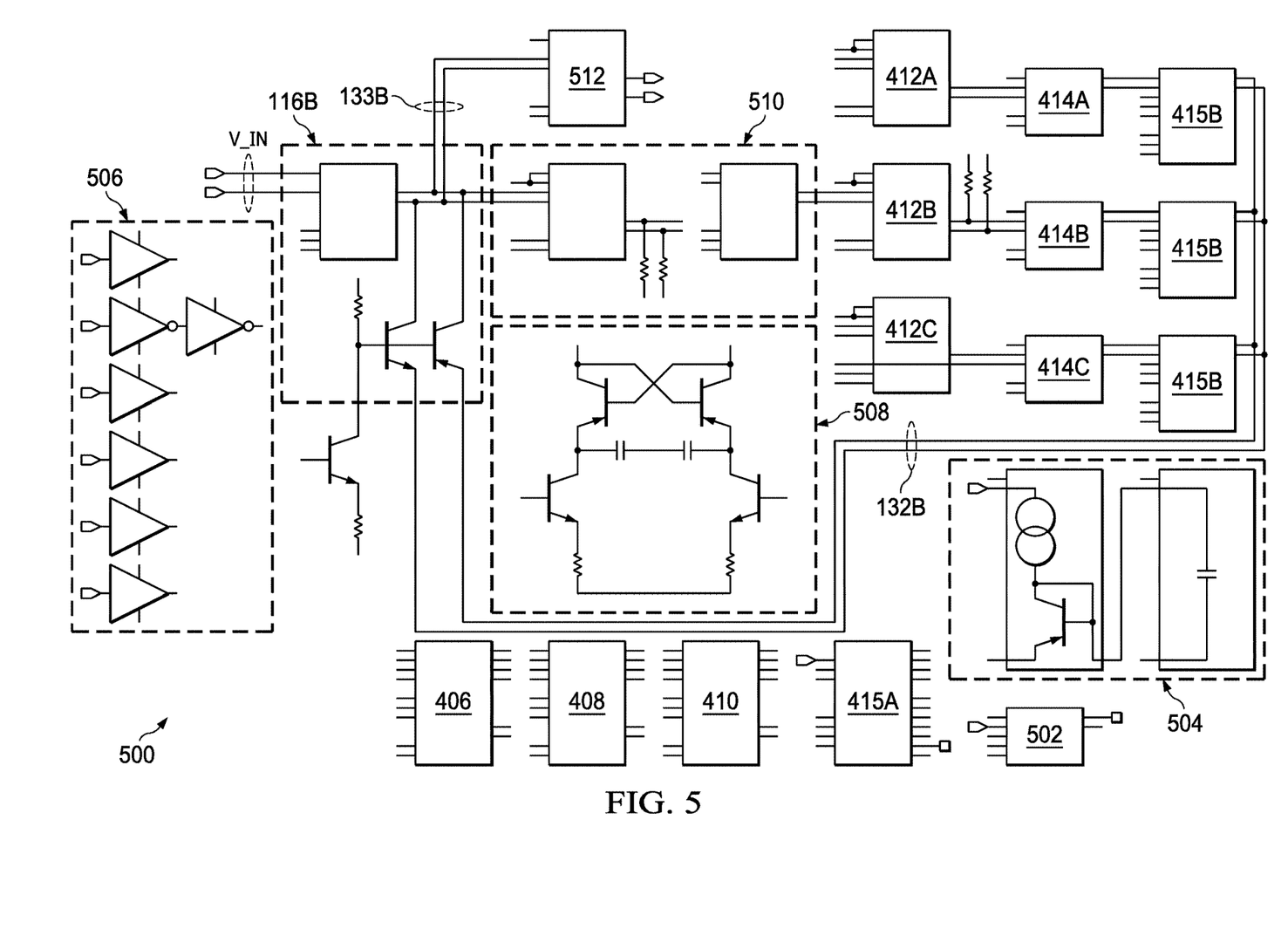
FIG. 5 shows circuit blocks for a clockless DFE loop in accordance with various examples.

FIG. 5 shows functional blocks of an example clockless DFE loop 500 in accordance with various examples. In FIG. 5, the clockless DFE loop 500 includes various components introduced in FIG. 4 along with some other components, where the clockless DFE loop 500 is used in a differential signaling scenario. As shown, the summation circuit 116B in FIG. 5 combines V_IN with a multi-level feedback signal 132B. In at least some examples, a bandwidth extension circuit 508 is included with the summation circuit 116B.

The combination signal 133B resulting from the summation circuit 116 is provided to a post-DFE loop component (e.g., a linear repeater) via a buffer 512. The combination signal 133B is also provided to the slicers 412A-412C via a two-stage buffer 510. The slicers receive respective thresholds 412A-412C from DACs 406, 408, and 410 as previously discussed in FIG. 4. The slicers 412A-412C represented in FIG. 5 provide quantized values of the combination signal 133B to circuits 415B, which correspond to part of the signed tap weight circuit 415 in FIG. 4. More specifically, the circuits 415B apply the sign to a tap weight provided by a circuit 415A, which corresponds to another part of the signed tap weight circuit 415 in FIG. 4. The outputs of the circuits 415B are combined to provide the next multi-level feedback signal 132B.

In some examples, the clockless DFE loop 500 also includes a buffer circuit 506, which provides control signals to the DACs 406, 408, 410, and the circuit 415A. In addition, the clockless DFE loop 500 includes bias circuits 502 and 504, which provide bias voltages to various components of the clockless DFE loop 500.

Figure 6:
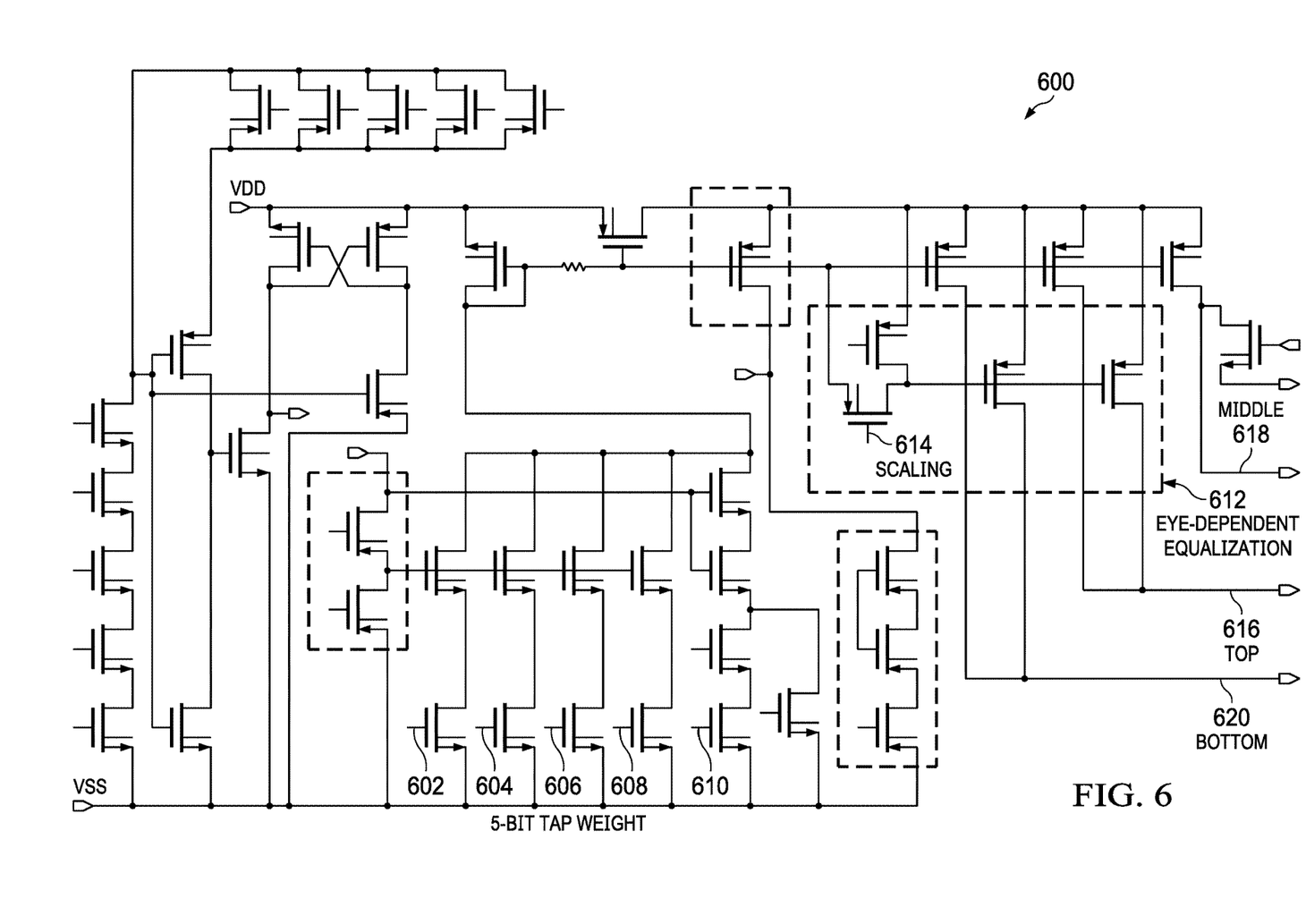
FIG. 6 shows a circuit for applying DFE tap weights in a clockless DFE loop in accordance with various examples.

FIG. 6 shows a circuit 600 for selecting DFE tap weights in a clockless DFE loop (e.g., the clockless DFE loop 114 in FIG. 1, the clockless DFE loop 114A in FIG. 3, the clockless DFE loop 114B in FIG. 4, or the clockless DFE loop 500 in FIG. 5) in accordance with various examples. As shown, the circuit 600 includes a plurality of transistors, which operate to adjust voltage levels at a top node 616, a middle node 618, and a bottom node 620 based on a 5-bit tap weight determined by the control signals 602, 604, 606, 608, and 610.

In some examples, a scaling control signal 614 is used to scale one or more of the voltage levels at the top node 616, the middle node 618, and the bottom node 620. In the example circuit 600, the scaling control signal 614 is selectively applied to an eye-dependent equalization portion 612 of the circuit 600. In one example, a scaling factor of 1.5 is applied to the voltage levels of the top node 616 and the bottom node 620 when the scaling control signal 614 is "high" (e.g., based on eye analysis results). In at least some examples, the circuit 600 represented in FIG. 6 corresponds to the circuit 415A in FIG. 5.

Figure 7:
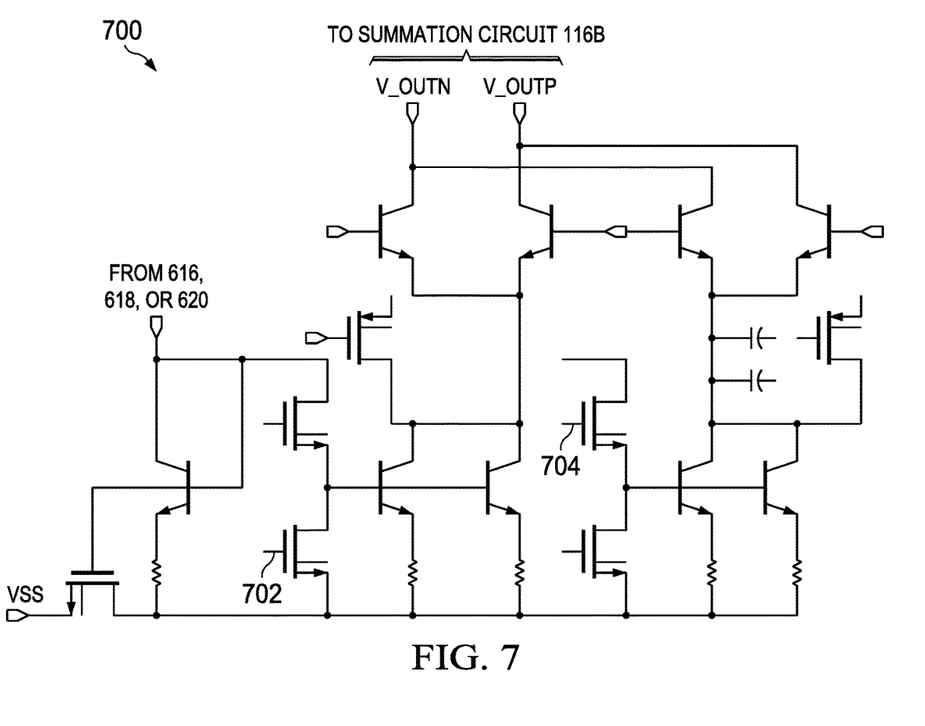
FIG. 7 shows a circuit for applying signs to DFE tap weights in a clockless DFE loop in accordance with various examples.

FIG. 7 shows a circuit 700 for applying signs to DFE tap weights in a clockless DFE loop (e.g., the clockless DFE loop 114 in FIG. 1, the clockless DFE loop 114A in FIG. 3, the clockless DFE loop 114B in FIG. 4, or the clockless DFE loop 500 in FIG. 5) in accordance with various examples. As shown, the circuit 700 includes a network of transistors and resistors, where the sign of a DFE tap weight is positive unless the control signals 702 and 704 are "high". In one example, the circuit 700 is replicated for each of the top node 616, the middle node 618, and the bottom node 620 represented in FIG. 6 to select a positive or negative sign for each respective tap weight. The output of each respective circuit 700 is combined, resulting in the multi-level feedback signal 1326, which is provided to the summation circuit 116B. In at least some examples, the circuit 700 represented in FIG. 7 corresponds to each of the respective circuits 415B in FIG. 5.

Figure 8A:
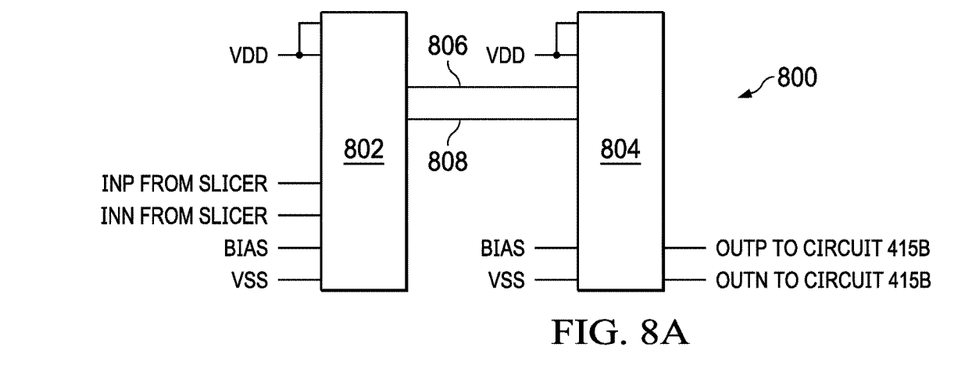
FIG. 8A-8C show a circuit for applying analog delay in a clockless DFE loop in accordance with various examples.
Figure 8B:
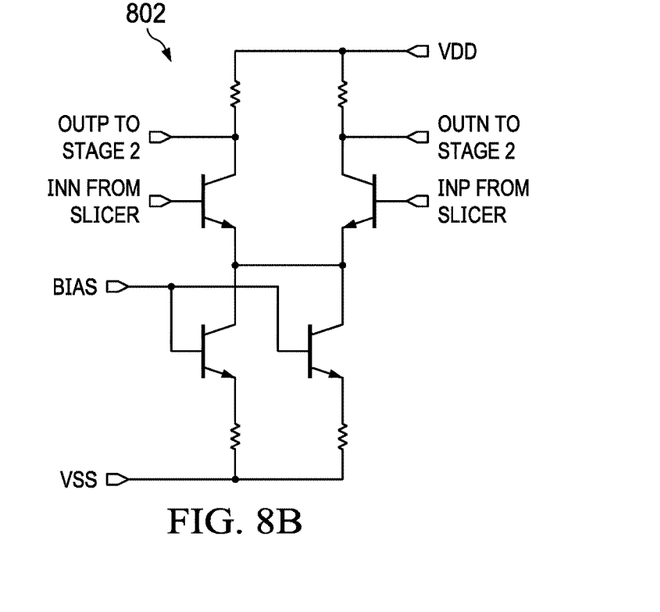
Figure 8C:
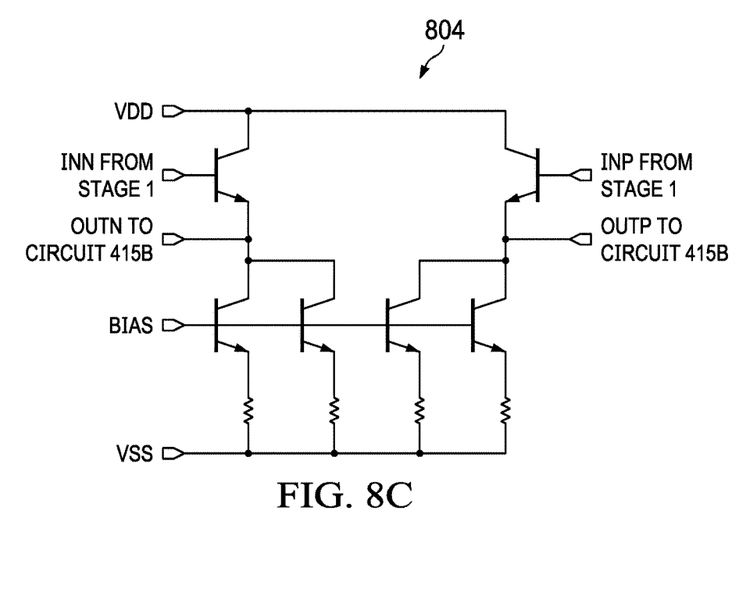

FIG. 8A-8C show a circuit 800 for applying analog delay in a clockless DFE loop (e.g., the clockless DFE loop 114 in FIG. 1, the clockless DFE loop 114A in FIG. 3, the clockless DFE loop 114B in FIG. 4, or the clockless DFE loop 500 in FIG. 5) in accordance with various examples. As shown in FIG. 8A, the circuit 800 includes a first delay buffer or delay circuit 802 and a second delay buffer or delay circuit 804 coupled by signal lines 806 and 808. An example of the first delay circuit 802 is represented in FIG. 8B, and an example of the second delay circuit 804 is represented in FIG. 8C. As shown in FIG. 8B, the first delay circuit 802 is formed by a network of transistors and resistors. Similarly, the second delay circuit 804 represented in FIG. 8C is formed by a network of transistors and resistors. As desired, capacitors coupled to ground are added to each of the signal lines 806 and 808 to increase the amount of delay (e.g., if receiver signaling is below 56 Gigabits/sec). In at least some examples, the circuits 800, 802, and 804 represented in FIGS. 8A-8C are an example of each of the respective analog delay circuits 414A, 414B, and 414C in FIGS. 4 and 5.

Figure 9:
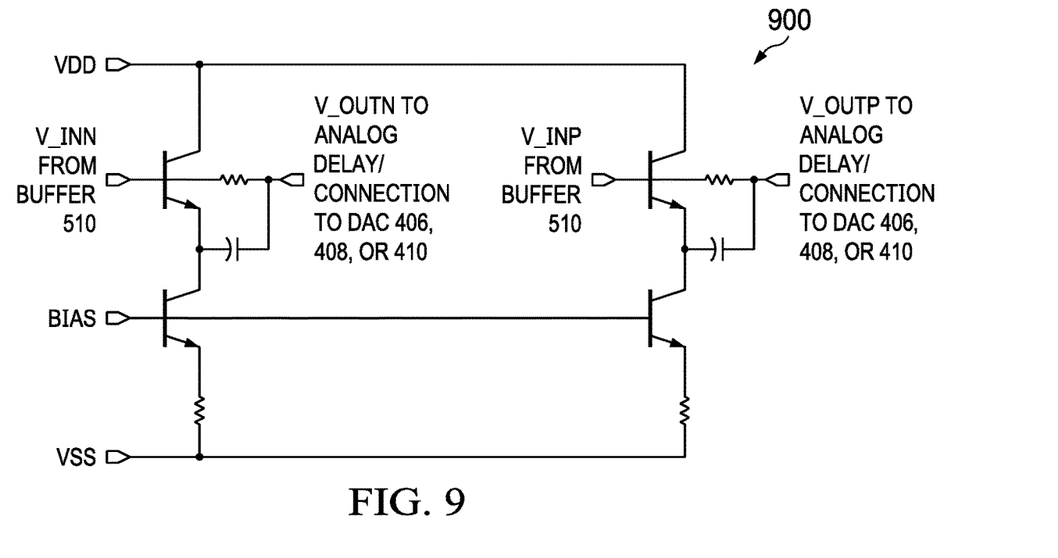
FIG. 9 shows a circuit for slicing a signal in a clockless DFE loop in accordance with various examples.

FIG. 9 shows a circuit 900 for slicing a signal in a clockless DFE loop (e.g., the clockless DFE loop 114 in FIG. 1, the clockless DFE loop 114A in FIG. 3, the clockless DFE loop 114B in FIG. 4, or the clockless DFE loop 500 in FIG. 5) in accordance with various examples. The circuit 900 operates as a comparator that compares an input signal to a threshold. Based on the comparison, the circuit outputs one of two voltage levels (e.g., −200 mV or +200 mV). In the example clockless DFE loops discussed herein, the circuit 900 would be replicated for each quantizer path, and the threshold would vary for each quantizer path. In at least some examples, the circuit 900 represented in FIG. 9 is an example of each of the respective slicers 412A, 412B, and 412C in FIGS. 4 and 5.

Figure 10:
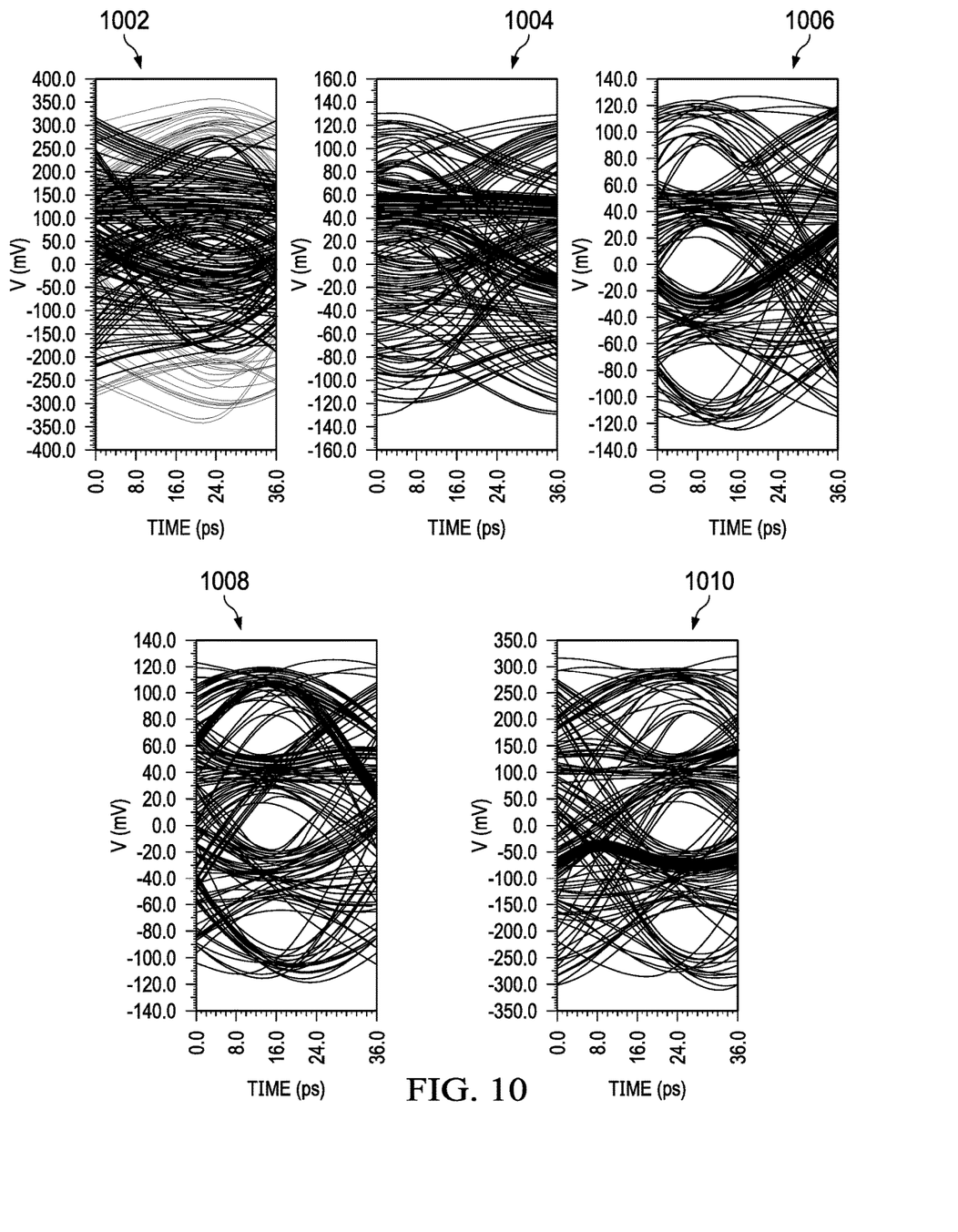
FIG. 10 shows graphs representing eye diagrams at different points of a receiver with a clockless DFE loop in accordance with various examples.

FIG. 10 show graph representing eye diagrams at different points of a receiver with a clockless DFE loop (e.g., the clockless DFE loop 114 in FIG. 1, the clockless DFE loop 114A in FIG. 3, the clockless DFE loop 114B in FIG. 4, or the clockless DFE loop 500 in FIG. 5) in accordance with various examples. The graph 1002 shows an eye diagram at the RX input (e.g., the signal input to the CTLE 112 in FIG. 1). The graph 1004 shows an eye diagram at the CTLE output (e.g., the signal output from the CTLE 112 in FIG. 1). The graph 1006 shows an eye diagram at the DFE sum node (e.g., the multi-level feedback signal output from the summation circuit 130 in FIG. 1). The graph 1008 shows an eye diagram at a repeater input signal (e.g., the combination signal 133 input to the repeater or other component 134 in FIG. 1). The graph 1010 shows an eye diagram at a repeater output (e.g., the signal output from the repeater or other component 134 in FIG. 1)

Figure 11:
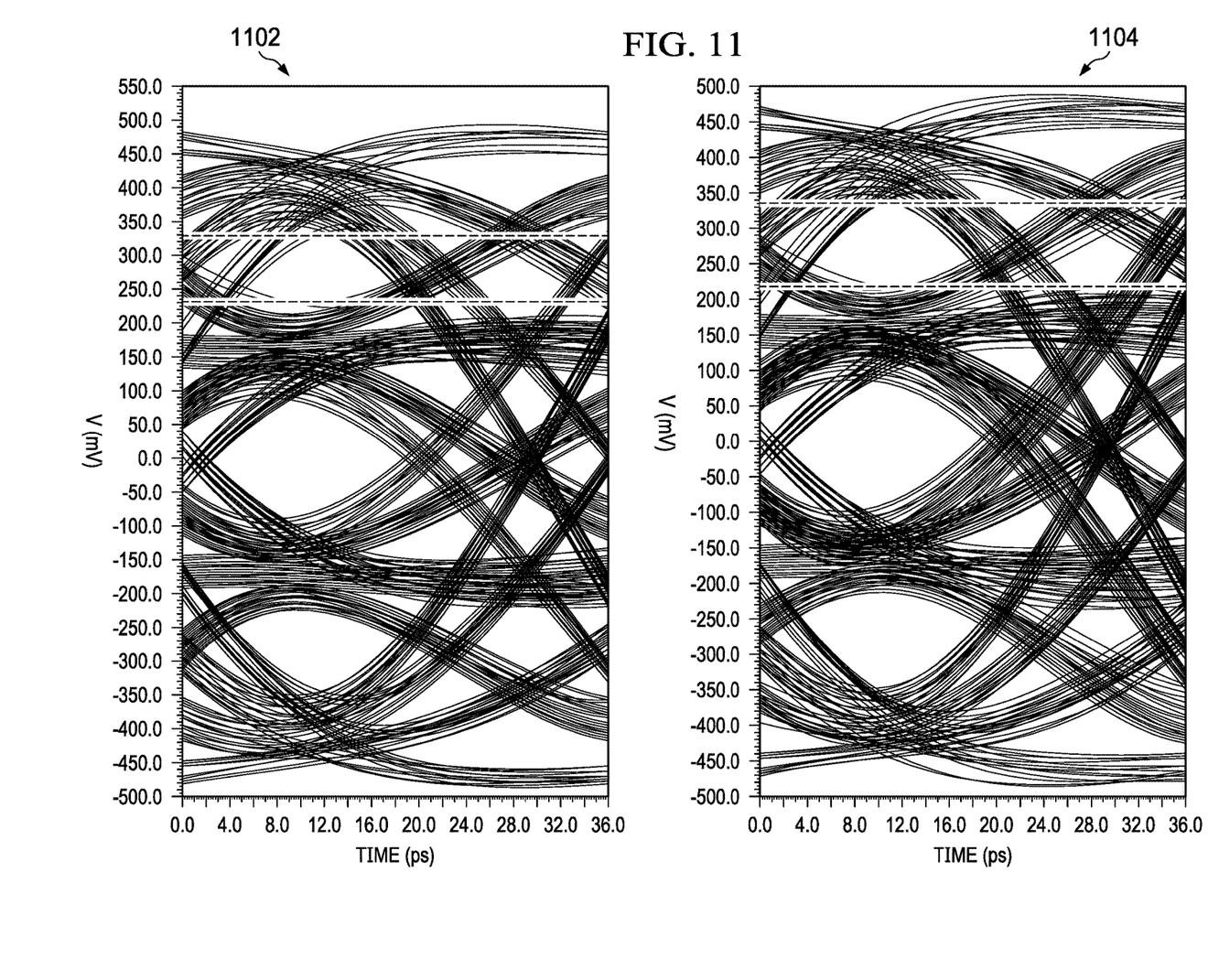
FIG. 11 shows graphs representing eye diagrams for different clockless DFE loop scenarios in accordance with various examples.

FIG. 11 shows graphs representing eye diagrams for different clockless DFE loop scenarios in accordance with various examples. More specifically, the graph 1102 represents an eye diagram at a repeater output (e.g., the signal output from the repeater or other component 134 in FIG. 1), where the same DFE tap weights are applied to the top, middle and bottom quantizer paths. Meanwhile, the graph 1104 represents an eye diagram at a repeater output (e.g., the signal output from the repeater or other component 134 in FIG. 1), where scaled DFE tap weights (e.g., a scaling factor of 1.5) are applied to the top and bottom quantizer paths to increase the eye openings.

Figure 12:
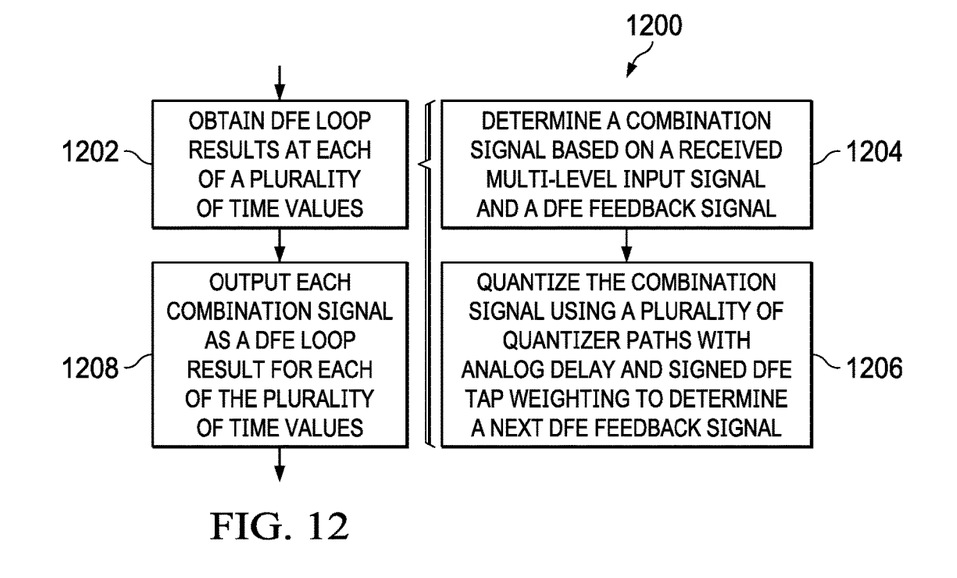
FIG. 12 shows a clockless DFE method in accordance with various examples.

FIG. 12 shows a clockless DFE method 1200 in accordance with various examples. As shown, the method 1200 comprises obtaining DFE loop results at each of a plurality of time values at block 1202. In some example, obtaining the DFE loop results at block 1202 involves determining a combination signal (e.g., the combination signal 133 in FIG. 1) based on a received multi-level input signal (V_IN) and a DFE feedback signal (e.g., the multi-level feedback signal 132 of FIG. 1). Obtaining the DFE loop results at block 1202 also involves quantizing the combination signal using a plurality of quantizer paths (e.g., the quantizer paths 120A-120N) with analog delay and signed DFE tap weighting to determine a next DFE feedback signal. The method 1200 also includes outputting each combination signal as a DFE loop result for each of the plurality of time values at block 1208.

In at least some examples, the quantizing operations of block 1206 involve different quantizer paths with respective slicers, where thresholds for at least some of the slicers are based on a peak-to-peak value for a combination signal. In some examples, obtaining DFE loop results at block 1202 involves applying scaled DFE tap weights to at least some of the quantizer paths. In some examples, the scaled DFE tap weights are selected based on eye analysis results. In some examples, the method 1200 also includes applying each DFE loop result to a linear repeater driver and/or other component.

Certain terms have been used throughout this description and claims to refer to particular system components. As one skilled in the art will appreciate, different parties may refer to a component by different names. This document does not intend to distinguish between components that differ in name but not function. In this disclosure and claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct connection or through an indirect connection via other devices and connections. The recitation "based on" is intended to mean "based at least in part on." Therefore, if X is based on Y, X may be a function of Y and any number of other factors.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A receiver comprising:
a decision feedback equalization (DFE) loop, wherein the DFE loop includes:
a summation circuit having a first input coupled to a multi-level input, a second input, and an output;
a multi-bit quantizer including a digital-to-analog converter (DAC) having an input coupled to the output of the summation circuit and having an output, and an analog-to-digital converter (ADC) having an input coupled to the output of the DAC, and having an output;
a delay circuit having an input coupled to the output of the DAC and an output providing a multi-level feedback signal; and
a DFE tap circuit having an input coupled to the output of the delay circuit and an output coupled to the second input of the summation circuit, wherein the DFE tap circuit is configured to apply signed DFE tap weights to the multi-level feedback signal;
wherein the multi-bit quantizer comprises quantizer paths, each quantizer path having a respective slicer set to a different threshold, and wherein the multi-level feedback signal is a combination of outputs from the quantizer paths.

2. The receiver of claim 1, wherein at least some thresholds used for the slicers are set based on the peak-to-peak value of the output of the summation circuit.

3. The receiver of claim 1, wherein the DFE tap circuit is configured to apply different signed DFE tap weights to different quantizer paths, wherein the different signed DFE tap weights are selected based on eye analysis results.

4. The receiver of claim 3, wherein the DFE tap circuit is configured to apply a scale to a base DFE tap weight.

5. The receiver of claim 1, wherein the multi-level input is a four-level input, the multi-level feedback signal is a four-level feedback signal, and the multi-bit quantizer is a 2-bit quantizer.

6. The receiver of claim 1, wherein an output of the DFE loop couples to a driver for a linear repeater.

7. A decision feedback equalization (DFE) loop comprising:
a summation circuit having a first input coupled to a multi-level input signal, a second input, and an output;
quantizer paths, each having a digital-to-analog converter (DAC) with an input coupled to the output of the summation circuit and with an output, and an analog-to-digital converter (ADC) having an input coupled to the output of the DAC, and having an output coupled to the second input of the summation circuit and configured to provide a multi-level feedback signal, wherein each quantizer path includes a respective slicer set to a different threshold and a respective analog delay circuit, and wherein the multi-level feedback signal is a combination of the outputs of the quantizer paths; and
a DFE tap circuit configured to apply signed DFE tap weights to the multi-level feedback signal.

8. The DFE loop of claim 7, wherein at least some thresholds used for the slicers are set based on the peak-to-peak value of the output of the summation circuit.

9. The DFE loop of claim 7, wherein different DFE tap weights are applied along each quantizer path.

10. The DFE loop of claim 9, wherein the different DFE tap weights are selected based on eye analysis results.

11. The DFE loop of claim 7, wherein the multi-level input is a four-level input, the multi-level feedback signal is a four-level feedback signal, and wherein the plurality of quantizer paths correspond to a 2-bit quantizer.

* * * * *